(12) United States Patent
Thillen et al.

(10) Patent No.: US 9,073,693 B2
(45) Date of Patent: Jul. 7, 2015

(54) DISTRIBUTION CHUTE FOR A CHARGING DEVICE

(75) Inventors: Guy Thillen, Diekirch (LU); Claude Thinnes, Kehlen (LU); Emile Lonardi, Bascharage (LU); Serge Devillet, Grevenmacher (LU)

(73) Assignee: PAUL WURTH S.A., Luxembourg (LU)

( * ) Notice: Subject to any disclaimer, the term of this patent is extended or adjusted under 35 U.S.C. 154(b) by 0 days.

(21) Appl. No.: 14/127,590

(22) PCT Filed: Jun. 6, 2012

(86) PCT No.: PCT/EP2012/060681
§ 371 (c)(1),
(2), (4) Date: Dec. 19, 2013

(87) PCT Pub. No.: WO2012/175335
PCT Pub. Date: Dec. 27, 2012

(65) Prior Publication Data
US 2014/0131162 A1    May 15, 2014

(30) Foreign Application Priority Data
Jun. 21, 2011    (LU) .......................................... 91829

(51) Int. Cl.
*B65G 11/00*        (2006.01)
*B65G 11/12*        (2006.01)
(Continued)

(52) U.S. Cl.
CPC ........... *B65G 11/12* (2013.01); *Y10T 29/49815* (2015.01); *Y10T 29/49826* (2015.01); *C21B 7/20* (2013.01); *F27B 1/20* (2013.01); *F27D 3/0033* (2013.01); *F27D 3/10* (2013.01)

(58) Field of Classification Search
USPC ................ 193/2 R, 3, 16; 414/299, 300, 301; 110/101 R, 115, 116, 117, 118; 126/10, 126/68, 73
See application file for complete search history.

(56) References Cited

U.S. PATENT DOCUMENTS 3,899,088 A  *  8/1975  Furuya et al. .................. 414/206
4,211,316 A  *  7/1980  Rymarchyk et al. .......... 193/2 R
(Continued)

FOREIGN PATENT DOCUMENTS

DE    3342572        6/1984
EP    0640539 A1    3/1995
(Continued)

OTHER PUBLICATIONS

International Search Report for corresponding application PCT/EP2012/060681 filed Jun. 6, 2012; Mail date Jul. 26, 2012.
(Continued)

*Primary Examiner* — James R Bidwell
(74) *Attorney, Agent, or Firm* — Cantor Colburn LLP

(57) ABSTRACT

A distribution chute for a charging device, a charging device having the same, and a methods for mounting and dismounting such chute, the chute including an upstream mounting head and a chute body, at least two lateral suspensions on the mounting head for mounting the chute to two corresponding support flanges pivotable about a pivoting axis for raising an outlet to a charging position and for lowering the outlet to a charging position, where the suspensions define a first and a second tilt point about which a weight of the chute exerts torque onto the support flanges of the charging device when the chute is mounted to the charging device, where the ratio of the distance between each of the tilt points and the pivoting axis to the distance between the first and second tilt points amounts to 0.25 at most, the suspensions being arranged so that an oriented acute angle from the longitudinal axis to a plane through the tilt points and the center of gravity has an angular measure in the range from −5° to 15°.

23 Claims, 6 Drawing Sheets

(51) Int. Cl.
*C21B 7/20* (2006.01)
*F27B 1/20* (2006.01)
*F27D 3/00* (2006.01)
*F27D 3/10* (2006.01)

(56) References Cited

U.S. PATENT DOCUMENTS

| | | | | |
|---|---|---|---|---|
| 4,360,305 | A * | 11/1982 | Dorsch | 414/208 |
| 5,022,806 | A | 6/1991 | Lonardi et al. | |
| 5,299,900 | A * | 4/1994 | Mailliet et al. | 414/206 |
| 5,513,581 | A | 5/1996 | Lonardi et al. | |
| 5,799,777 | A * | 9/1998 | Mailliet et al. | 198/642 |
| 6,390,268 | B1 * | 5/2002 | Lonardi | 193/16 |
| 7,311,486 | B2 * | 12/2007 | Gorza et al. | 414/301 |
| 2012/0181140 | A1 * | 7/2012 | Tomisaki | 193/16 |

FOREIGN PATENT DOCUMENTS

| | | |
|---|---|---|
| EP | 0863215 A1 | 9/1998 |
| GB | 1487527 | 10/1977 |
| GB | 2249618 A | 5/1992 |
| LU | 65663 | 10/1972 |
| LU | 87380 A1 | 6/1990 |
| WO | 0118255 | 3/2001 |
| WO | 2006134165 A2 | 12/2006 |
| WO | 2010028894 | 3/2010 |

OTHER PUBLICATIONS

Written Opinion for corresponding application PCT/EP2012/060681 filed Jun. 6, 2012; Mail date Jul. 26, 2012.

* cited by examiner

DISTRIBUTION CHUTE FOR A CHARGING DEVICE

TECHNICAL FIELD

The present invention generally relates to a charging device of the type that rotates and pivots a distribution chute about a rotational axis and a pivoting axis respectively. Specifically, the invention relates to a charging device for burden distribution in a blast furnace for producing pig iron or in any similar shaft furnace or metallurgical reactor.

More specifically, the invention relates to the distribution chute itself and to an improved arrangement of the suspension device for mounting the chute to the charging device.

BACKGROUND ART

Known charging devices are designed to support, to rotate and to pivot the chute. Typically, rotation and pivoting is about two respective perpendicular axes so as to distribute bulk material in circumferential and radial directions, e.g. on a charging surface inside a blast furnace. In a widespread design, the chute used in this kind of charging device has a chute body, in which at least a downstream chute portion or even all of the chute body is of elongated shape and extends along a longitudinal axis. The chute body defines, at least at its downstream portion, a usually concave internal sliding surface, e.g. a semi-cylindrical or rectangular trough-shaped surface, on which charge material slides during operation. The chute body also defines an outlet at its downstream end, at which charge material leaves the chute body. At its opposite, upstream end, the chute usually has two suspensions, i.e. means for suspending the chute to the charging device. In order to rotate the chute, the charging device has a rotor that is rotatable, e.g. about the vertical central axis of the furnace, and two opposite support flanges for supporting the chute. The support flanges cooperate with the two lateral suspensions on the chute to hold the chute at its upstream end. In order to set the extent of radial distribution, the support flanges are pivotable about the pivoting axis in two directions, namely in a raising sense for raising the chute outlet to a radially outermost charging position and in an oppositely directed lowering sense for lowering the outlet to a radially innermost charging position with respect to the rotational axis. In case of blast furnace charging, the outermost charging position corresponds to so-called "wall charging" close to the furnace shell. The innermost charging position is used for so-called "center charging" e.g. for creating a coke chimney.

A very widespread chute design of this type is known e.g. from U.S. Pat. No. 5,513,581 or European patent EP 0 640 539. For mounting the chute onto corresponding support flanges of the charging device, this chute has two lateral suspensions (also referred to as "suspension devices") of so-called "duckbill shape". Duckbill shaped suspensions, already known from German patent application DE 3342572 and also illustrated in U.K. patent GB 1 487 527, have proven very satisfactory in practice and been widely used for several decades. However, they require a rather complex mounting and dismounting procedure. This procedure includes installing a handling device, lifting the outlet end of the chute, pivoting the support flanges, tilting the chute, lowering into the furnace, etc. Special handling devices have been described e.g. in Luxembourg patent LU 65663 and also in PCT patent application WO 01/18255. Such counter-balancing devices are necessary among others because the chute must be held in position underneath the charging device before its specifically shaped suspensions can be fixed to the support flanges. Of course, the risk of dropping the chute during the procedures must definitely be avoided.

With the aim of improving over these known drawbacks, a new kind of chute suspension has been described in WO 2010/028894. This kind of chute is shown in enclosed FIG. 2. It has suspensions of generally hook-shaped design with abutment and counter-abutment surfaces. The latter counter-act torque exerted onto the support flanges of the charging device when the chute is mounted. As will be understood, the chute is supported at one side only in nearly "cantilevered" manner generally at the end opposite its outlet. Accordingly, considerable chute weight plus that of sliding charge material exerts considerable torque onto the support flanges of the charging device. This torque would naturally tend to jam the chute with respect to the support flanges. There are two main benefits of a chute with suspensions as shown in enclosed FIG. 2. The hook-shaped suspensions minimize the risk of inadvertent dropping of the chute during the final and initial phases of mounting and dismounting respectively. Secondly, no additional counter-balancing devices are necessary.

As will be understood from the foregoing however, commonly used chute suspension designs, e.g. of "duckbill-shaped" or hook-shaped configuration, are usually of complex shape, which in turn renders intricate or complex the movement or relative motion needed for mounting and dismounting. In addition to complex geometries of the suspension and of the support flange, the tilting torque that the chute weight exerts onto the support flanges impedes mounting and dismounting.

Another simplified known design of a chute and of chute suspensions is disclosed in U.S. Pat. No. 5,022,806 and illustrated in enclosed FIG. 1. This chute has a trough-shaped chute body of generally rectangular cross-section. The chute body is entirely of elongated shape and extends along a longitudinal axis for channeling a flow of bulk material on a sliding surface towards the chute outlet. As a suspension on each side, this chute possesses two lateral pins capable of sliding into and of being retained by corresponding grooves in each support flange. The chute according to U.S. Pat. No. 5,022,806 can be retained with its suspensions engaged in the flanges due to its own weight. As a prominent feature according to U.S. Pat. No. 5,022,806, mounting and dismounting of the chute can be achieved simply by pulling or inserting the chute along its longitudinal axis, once the support flanges have been pivoted into the required replacement position. Even with a simplified suspension design according to U.S. Pat. No. 5,022,806 however, the tilting torque of the chute onto the support flanges still hampers mounting and dismounting.

BRIEF SUMMARY

The invention provides a chute configuration that further facilitates mounting and dismounting of the chute to a charging device and avoids significant torque reversal onto the support structure of the chute during operation.

The invention relates to a distribution chute for use in a charging device that rotates the chute about a rotational axis and pivots the chute about a pivoting axis. The chute is suitable in particular for a charging device of a shaft furnace such as a blast furnace.

A chute according to the invention comprises an upstream mounting head for mounting the chute to the charging device and a main chute body that channels bulk material. The chute body has an downstream chute portion that is elongated along a longitudinal axis and defines a sliding surface, on which charge material can slide, preferably a convex sliding surface on which material slides in laterally confined manner. The downstream portion further defines an outlet, through which charge material can leave the chute body, i.e. falls into the metallurgical reactor during operation. The chute further includes at least two lateral suspensions provided at each side of the mounting head and cooperating with at two corresponding support flanges of the charging device for mounting the chute there to. These support flanges pivot about the pivoting axis in a raising sense for raising the outlet to an outermost radius and oppositely for lowering the outlet to a innermost radius with respect to the rotational axis.

The chute has an intrinsic nominal center of gravity, meaning the center of gravity in unloaded i.e. empty state of the chute (without carrying charge material) and in unworn condition that depends on its structure. The suspensions define a first and a second tilt points (in turn defining a tilt axis coinciding with or parallel to the pivoting axis) about which the weight of the chute exerts jamming torque onto the support flanges of the charging device when the chute is mounted to the charging device. This torque depends on the radial position of the center of gravity. The more the chute is pivoted in the raising sense, the more the lateral suspensions are jammed with the support flanges by virtue of the torque. When the tilt axis, defined by the first and second tilt points, and the center of gravity are substantially vertically aligned, the jamming torque is minimal (chute replacement position). The suspensions are configured in such a way that the ratio of the distance between each one of the tilt points and the pivoting axis to the distance between the first and second tilt points (which corresponds at least approximately to the distance between the suspensions) amounts to 0.25 at most, preferably to between 0.1 and 0.15.

In accordance with the invention, the suspensions of the chute are arranged or positioned generally offset toward the bottom of the sliding surface (the portion most exposed to wear). More specifically, the suspensions are positioned so that the acute (signed or oriented) angle (hereinafter denoted $\alpha$) from the longitudinal axis to a (virtual) plane through the tilt axis and through the center of gravity has an angular measure in the raising sense, that is not substantially negative, i.e. greater than or equal to −5° and that is less than or equal to 15° (more preferably less than 10°, still more preferably less than or equal to 5°). This means that if $\alpha$ is oriented in the raising sense (which is taken as the positive sense of reference), the absolute value of $\alpha$ is less than or equal to 15°, i.e. $|\alpha| \leq 15°$. If $\alpha$ is oriented opposite the raising sense, the absolute value of $\alpha$ is less than or equal to 5°, i.e. $|\alpha| \leq 5°$.

To avoid torque reversal as much as possible, the suspensions are preferably arranged so that the chute exerts torque in the lowering sense onto the support flanges when the chute is being pivoted into its replacement position, in which its longitudinal axis is oriented substantially vertically, that is to say at an angle of less than 5° with respect to the vertical. In other words, the chute's replacement position corresponds to the lowest position that the chute may reach, which is beyond the so-called center-charging position.

As will be understood, the aforementioned tilt axis position and accordingly the sense of torque exerted onto the support flanges of the charging device depends on the design and notably on the position of the suspensions on the chute. The proposed design significantly simplifies mounting/dismounting of the chute because it avoids existence of any significant torque exerted by the chute onto the cooperating supporting flanges in the replacement position, in which—as another remarkable aspect—the chute is oriented generally vertically. There being little if any torque in the replacement position, no particular procedure is required for "deblocking" the chute from the support flanges, and the chute may simply be lifted upwards or lowered onto the support flanges for removal and installing respectively. Moreover, reversal of tilting torque between the two extreme pivoting positions during operation can be avoided as another notable benefit. With known prior art designs, there is a reversal of tilting torque exerted onto the support flanges at some given pivoting angle, when the chute is lowered in the lowering sense from the raised outermost charging position toward the lowered innermost charging position. As will be understood when considering the weights in questions amounting usually to several tons or tens of tons, such reversal causes shocks that notably increase wear of the pivoting mechanism, the suspensions, the cooperating flange portions, the bearings that allow rotating the chute support, etc.

In the present context, the term "suspension" is used to refer to any kind of device or arrangement of one or more parts suitable for holding the chute on the support flanges of the charging device. The expression "the vertical" obviously refers to a vertically oriented reference axis, e.g. a vertical axis that may coincide with the rotation axis of the charging device.

To further reduce tilting torque in replacement position and depending on the chosen chute design, the acute angle between the mentioned virtual plane and the longitudinal axis preferably has a measure in the raising sense that is greater than zero, preferably in the range of from 0° to +15°.

Preferably, the suspensions are arranged on the chute so that the center of gravity is located at a perpendicular distance from the plane passing through the tilt axis and parallel to the longitudinal axis, which distance is less than 10%, preferably less than 5%, of the length of the elongated downstream chute portion as such.

In a robust design, the mounting head is of annular circumferentially closed configuration and the suspensions are integrally formed with the mounting head so as to protrude laterally and oppositely away from the central chute axis at the height of the suspensions. In a preferred embodiment, the suspensions may be integrally cast together with a mounting head made of cast metal, e.g. cast iron or cast steel.

For increased safety, the suspensions and support flanges may comprise at least one safety pin and a cooperating pin hole. In normal operation of the charging device, torque exerted by gravity about the tilt axis (i.e. the line passing through the tilt points) secures the chute to the support flanges and thus prevent the chute from dropping into the metallurgical reactor. Accordingly, the safety pin is not necessary under normal circumstances. However, the safety pin may be useful for preventing an accidental movement of the chute, e.g. in case of an explosion in the metallurgical reactor, which could cause the chute suspensions to disengage from the support flanges. The safety pin preferably has an axis coinciding with the tilt axis to avoid torque exerted thereon.

In a preferred design of the new type of suspensions, that is statically well defined to reliably resist torque in the lowering sense e.g. in the outermost charging position, each suspension, in addition to at least one lateral protrusion having a weight-bearing surface to cooperate with a bearing protrusion on the corresponding support flange, comprises two oppositely oriented torque-transmitting surfaces that are generally transverse to the weight bearing surface to cooperate with two abutments on the corresponding support flange, the torque-transmitting surfaces preferably being substantially planar. In this kind of design, each suspension may comprise a single coherent mounting protrusion that is elongated along a direction that is preferably at a small angle, e.g. of less than 5°, with the longitudinal axis and that defines a vertical mounting/ dismounting direction for replacement of the chute in its replacement position. In a simple yet reliable configuration, the single coherent mounting protrusion is of polygonal mirror-symmetrical shape with respect to its elongation, in particular of generally quadrilateral, preferably rectangular or trapezoidal shape in cross-section. Alternatively, with parts inverted between suspensions and support flanges, each suspension may also comprise three distinct mounting protrusions, a first protrusion defining the weight bearing surface, as well as a second and third protrusion that respectively define opposite torque-transmitting surfaces.

In a chute design that is particularly suitable for a replacement along the vertical without reduction of charging radius, the upstream mounting head is bent so that it has a central axis at a bend angle with respect to the longitudinal axis, the bend angle measuring from 15° to 45°, preferably from 20° to 40°. With this kind of design, in chute replacement position, the downstream longitudinal axis is preferably at an angle to the vertical, that ranges from 0° to +5° when measured in the raising sense. Preferably, the elongated downstream chute portion is of conical or cylindrically tubular and circumferentially closed configuration and fixed to the mounting head. In order to permit pivoting the chute to a radially further outward charging position in the raising sense, the mounting head preferably comprises a recess that avoids impact on the charging device in the radially outermost chute position.

The invention also relates to a charging device including a chute according to the invention and having corresponding cooperating support flanges.

Thanks to of the new chute configuration, the tilt axis about which the weight of the chute exerts torque onto the support flanges may be offset from the pivoting axis, so as to avoid modification in the pivoting mechanism. When seen in a horizontal plane, with a chute as set out above, the tilt axis may thus be offset from the pivoting axis, namely toward the main sliding surface of the chute body.

Aspects of the present invention are furthermore concerned with the mounting and the dismounting of a distribution chute. Preferably, the distribution chute being mounted or dismounted is configured as described hereinabove.

The method of mounting a distribution chute to a charging device comprises:
    aligning the at least two suspensions with the support flanges while lowering the distribution chute along the rotational axis and making the at least two suspensions rest upon the support flanges, and
    rotating the support flanges about the pivoting axis in the raising sense, so that the weight of the chute exerts jamming torque onto the support flanges.

Preferably, prior to the aligning of the at least two suspensions with the support flanges, the distribution chute is raised along the rotational axis until the at least two suspensions are higher than the support flanges. While the distribution chute is raised, it is preferably kept rotated (e.g. by an angle of at least 15° to 25°, more preferably 20°) about the rotational axis relative to the charging device so as to allow the at least two suspensions to pass the support flanges. During the mounting, the distribution chute thus undergoes a movement relative to the charging device that resembles the movement of the male part of a bayonet connector relative to the female part: inward movement, rotation about the axis of insertion, outward movement until the parts abut against each other. It should be noted, however, that the support flanges of the charging device are mirror-inverted to each other, whereas the female part of a bayonet connector typically shows a discrete rotational symmetry about the axis of insertion. A consequence of this is that the rotation about the axis of insertion and the outward movement are not, in the case of the distribution chute, superposed to one another. So, there is no complete analogy to a bayonet connector but the comparison is good to give an idea of the movement of the distribution chute relative to the charging device. It is worthwhile noting that the relative movement between the distribution chute and the charging device is important. Indeed, in practice, it is easier to rotate the charging device while the orientation of the distribution chute is kept constant in a stationary reference frame.

In the method of dismounting a distribution chute from a charging device, the mounting steps are essentially carried out in time-reversed manner. In particular, that method comprises:
    rotating the support flanges about the pivoting axis in the lowering sense until the weight of the chute exerts no or no significant jamming torque onto the support flanges;
    lifting the distribution chute from the support flanges and raising the distribution chute along the rotational axis (preferably in a translational movement).

Preferably, after the distribution chute has been raised, it is lowered along the rotational axis, while it is kept rotated (e.g. by an angle of at least 15° to 25°, more preferably 20°) about the rotational axis relative to the charging device so as to allow the at least two suspensions to pass the support flanges.

As those skilled in the art will appreciate, the present method simplifies the mounting and the dismounting of the distribution chute. In particular, the mounting and the dismounting may be carried out using cables or ropes on which the chute is suspended. Alternatively or additionally a mounting arm may be used.

In both mounting and the dismounting method, preferably the charging device is rotated about the rotational axis relative to a stationary reference frame, whereas the orientation of the distribution chute about the rotational axis is kept unchanged in that reference frame. This is particularly advantageous if the chute is mounted or dismounted using cables or ropes.

BRIEF DESCRIPTION OF THE DRAWINGS

Further details and advantages of the present invention will be apparent from the following detailed and not limiting description of several embodiments with reference to the attached drawings, wherein.

Throughout these drawings identical or functionally corresponding elements will be indicated by identical reference signs differing merely in their hundreds digit.

DETAILED DESCRIPTION

Figure 1:
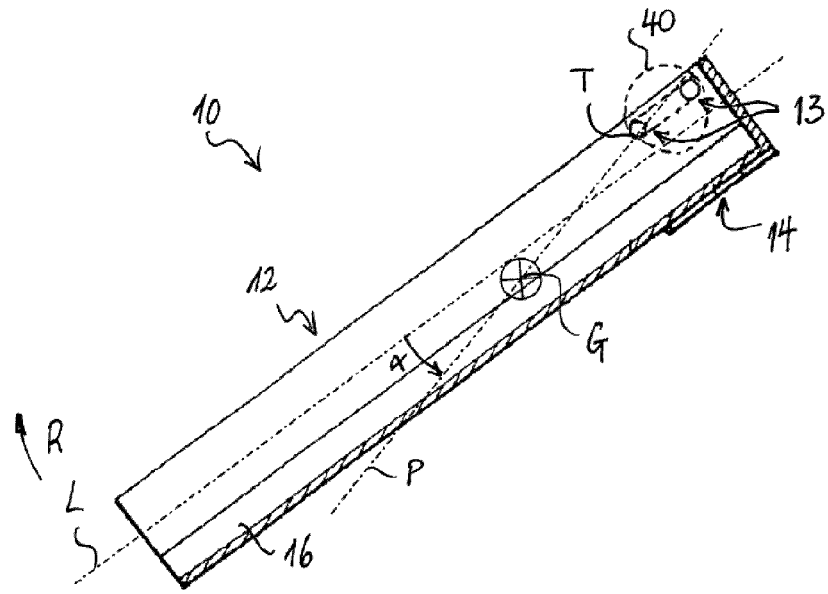
FIG. 1 is a longitudinal side view of a prior art distribution chute as known from U.S. Pat. No. 5,022,806, which is not subject of the invention.

FIG. 1 illustrates a distribution chute, generally identified by reference number 10, according to U.S. Pat. No. 5,022, 806, the teachings of which are incorporated herein by reference in their entirety specifically as concerns the charging device structure. This chute 10 has a trough-shaped chute body 12. For channeling bulk material towards the chute outlet, the chute body 12 of FIG. 1 has a generally rectangular cross-section in a plane perpendicular to FIG. 1 and it has an elongated shape. Other cross-sections, e.g. semi-circular or oval shaped are also common and within the present scope. The entire chute body 12 extends along a longitudinal axis L. For mounting the chute 10 to a distribution device (not shown), it has as a mounting head 14 with a suspension device comprising a respective lateral suspension 13 on each side of the body 12. In known manner, the suspensions are mirror symmetric to a general plane of chute symmetry that is parallel to FIG. 1.

Each suspension 13 of FIG. 1 comprises two lateral pins that are capable of sliding into corresponding grooves in each of two support cooperating support flanges indicated by dashed lines at reference 40 in FIG. 1. When mounted, the chute 10 is retained by the two lateral suspensions 13 and held in generally cantilevered manner. The chute 10 of FIG. 1 is designed for simplified mounting and dismounting by pulling or inserting the chute 10 along its longitudinal axis L. This procedure is possible, once the support flanges 40 have been pivoted into the required replacement position (as illustrated in the first two drawings of U.S. Pat. No. 5,022,806) and a locking bolt (not shown) has been removed from between the pins of the suspension 13.

As can be seen from an approximate indication of the nominal center of gravity G of the chute 10 of FIG. 1, in the nominal position for exchange of the chute there will be considerable torque exerted onto the support flanges 40. This torque would tend to tilt the chute 10 about a first and a second tilt point on either side of the chute. These tilt points define an axis herein referred to as tilt axis T. Such undesired tilting relative to the support flanges 40 is to be distinguished from desired pivoting in unison and together with the support flanges 40 that are meant to pivot about the pivoting axis for radial distribution. Even if one changed the design so as to orient the chute body 12 vertically for the purpose of its exchange—which is not taught in the prior art—there would still remain considerable torque. This is because with a design as in FIG. 1, the center of gravity G is located at a considerable horizontal distance from a vertical plane passing through axis T when the chute 10 is vertical, i.e. oriented so that its longitudinal axis L is vertical. In FIG. 1, a corresponding acute angle $\alpha$, (acute meaning the smaller of the two angles), between the longitudinal axis L and a virtual plane P passing through the tilt axis T and through the center of gravity G has a considerable absolute angular measure, e.g. >10°. As will be understood, the extent of tilting torque depends among others on the absolute value of this critical acute angle when the chute is in exchange position. Any remaining tilting torque is obviously quite undesirable during exchange because it tends to block the suspensions 13 in their support flanges 40 and increases the force required to disengage each suspension 13 from its support flange 40.

Figure 5:
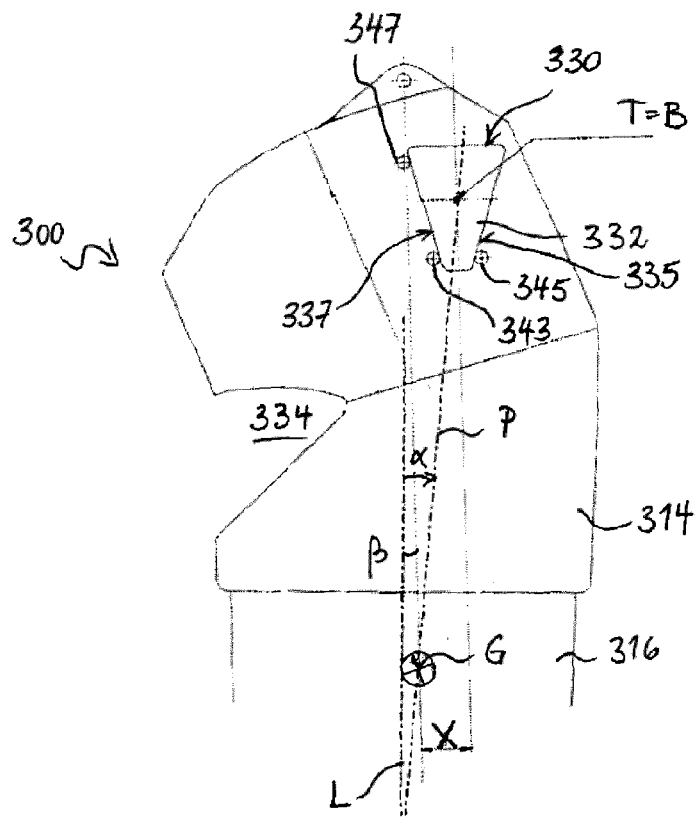
FIG. 5 is a partial longitudinal side view of a third embodiment of a distribution chute according to the invention.

As will be appreciated, the tilt axis T and the pivoting axis B are relatively close to each other. (As shown in FIG. 5, they may even coincide.) In particular, the ratio of the distance between the tilting axis T and the pivoting axis B to the distance between the first and second tilt points on either side of the distribution chute amounts to 0.25 at most, preferably to between 0.1 and 0.15. In case of a distribution chute for a shaft furnace, the tilt points are typically between 1.5 m and 1.8 m apart, while the radius of the mounting flanges (corresponding to the maximum distance between the tilt axis T and the pivoting axis B) is typically less than 0.3 m (preferably between 0.18 m and 0.24 m).

Moreover, as seen in FIG. 1, when measured in the raising sense R of pivoting, i.e. in the sense towards an outermost charging position (clockwise in the side views of FIG. 1-5), the acute angle $\alpha$ has a negative (or anti-clockwise in the case of FIGS. 1-5) measure, i.e. $\alpha < -10°$. In consequence, when pivoting the chute 10 from an outermost to a center charging position, e.g. with its longitudinal axis L vertical or nearly vertical, there will be a reversal of the aforementioned tilting torque about axis T as exerted onto the support flanges. This torque will change or "reverse" from a torque in the lowering sense to a torque in the raising sense R at some inclination of the chute axis L. With an empty chute, the point of torque reversal or inversion is when the tilt axis T and the center of gravity of the chute are vertically aligned. This approximately corresponds to the position where the axis L is inclined with respect to the vertical by angle $\alpha$. In practice the pivotal position of torque reversal depends on the amount of charge currently carried on the chute. Such reversal has been found to be undesirable because it tends to induce shocks that increase wear on important system components including the pivoting mechanisms and expensive bearings of the charging device.

Figure 2:
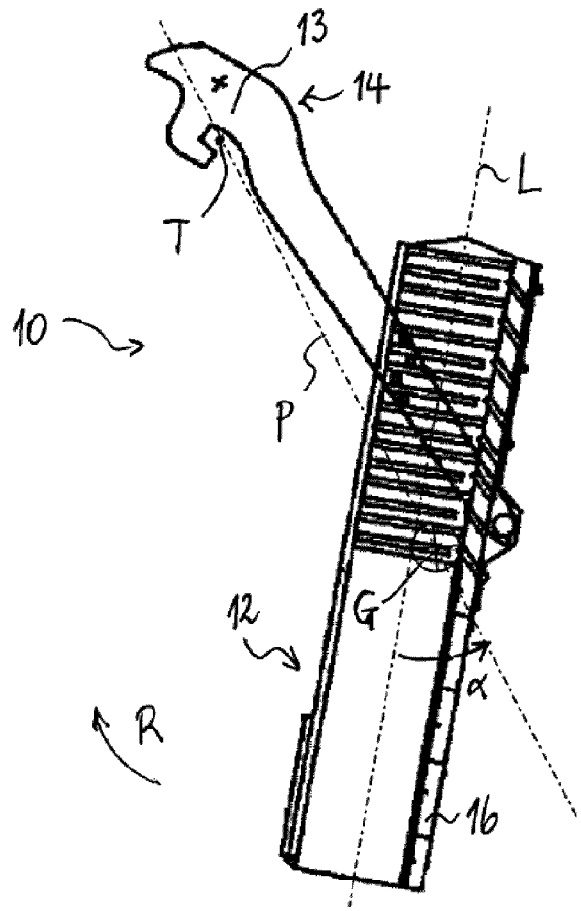
FIG. 2 is a longitudinal sectional view of a prior art distribution chute as known from PCT application WO 2010/028894, which is not subject of the invention.
Figure 3:
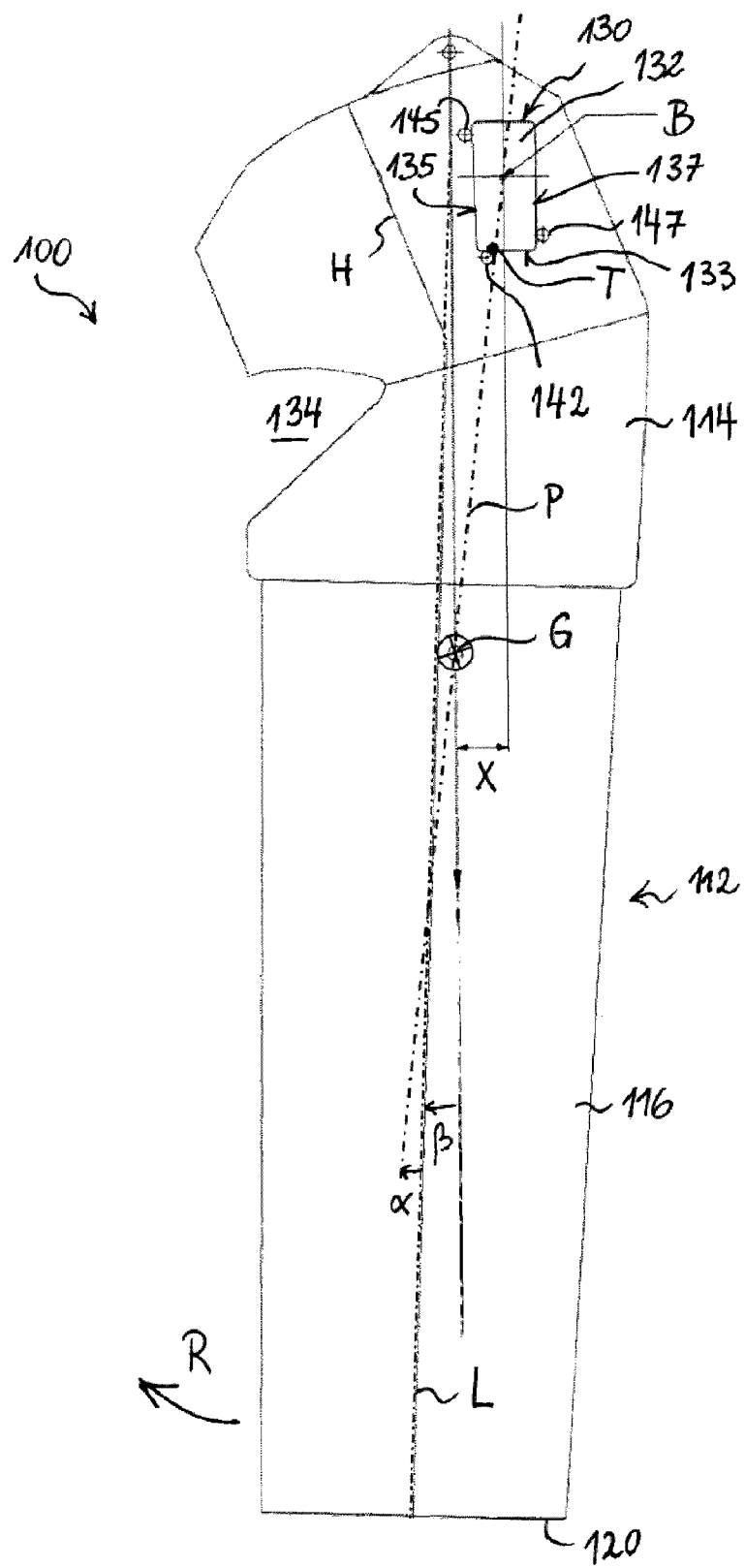
FIG. 3 is a longitudinal side view of a first embodiment of a distribution chute according to the invention.

Another prior art distribution chute 10, as disclosed in WO2010/028894, is illustrated in FIG. 2. A main difference compared to the above type of chute is that the lateral suspensions 13 of its mounting head 14 are provided on a respective arm for constructional reasons. In fact, this chute is designed for devices of medium size or small size reactors. Another main difference as seen in FIG. 3 is the specific "seahorse" or hook-type shape of the suspensions 13. This shape provides abutment and counter-abutment surfaces compensating the mentioned tilting torque about axis T when the chute 10 is mounted. Moreover the hook-shaped suspensions minimize the risk of dropping the chute 10. In terms of the tilting effect described in relation to FIG. 1, the chute of FIG. 2 has similar properties because the acute angle $\alpha$ as measured in the raising sense R from the longitudinal axis L to the plane P also has a considerable negative value $<< -10°$.

Undesirable consequences due to tilting torque are avoided by embodiments according to the invention as described by reference to FIGS. 3.-7 hereinafter.

A first embodiment of a chute 100 shown in FIG. 3 has a chute body 112 with an upstream mounting head 114. The chute body 112 has an elongated downstream chute portion 116 that extends along a longitudinal axis L. During operation, the chute portion 116 provides a sliding surface, on which charge material slides to a downstream outlet 120 from which charge material (such as e.g. coke, ore, pellets, sinter etc.) leaves the chute body 112. The downstream chute portion 116 as such is of conical or cylindrical tubular construction, preferably with a fully closed outer shell in circumferential direction about axis L.

FIG. 3 shows the chute 100 in its actual replacement position. The chute 100 is designed so that in this position, the longitudinal axis L of the main chute portion 116 is at a small angle $\beta$ to the vertical. The angle $\beta$ has comparatively small angular measure in the raising sense R, i.e. in the range $0° \le \beta \le +5°$, for example $\beta = 1.5 - 2.5°$. The exchange position is not absolutely, but nevertheless generally, vertical. The small angle $\beta$ is due to a bend shape of the mounting head 114. As seen in FIG. 3, the mounting head 114 has a bend in the raising sense R so that its central axis H is at an angle with respect to the axis L of the main chute portion 116, which permits reaching an increased pivoting angle of the main chute portion 116 at outermost charging. The acute bend angle between axes H and L is in the range from 15° to 45°, preferably 20° to 40°. To the same effect of increasing pivotal reach, the mounting head 114 comprises a recess 134 that permits reaching a radially further outward charging position without causing the chute to abut against the rotor that supports the chute. In view of increased mechanical stability at reduced weight, the mounting head 114, similar to the main portion 116, has a generally annular structure of closed configuration in circumferential direction around its axis H.

At each side of the mounting head 114 (with respect to the main longitudinal plane of symmetry of FIG. 3), the chute 100 has a respective lateral suspension 130. Two suspensions 130 are provided nearly diametrically and in mirror symmetry with respect to the plane of FIG. 3 and are required for reliably suspending the chute 100 on two corresponding support flanges 140 of the charging device (not shown in FIG. 3, see FIG. 6 or 7). The suspensions 130 also serve as holding elements, through which the pivoting torque for positioning the chute 100 is transmitted when the support flanges 140 pivot the chute 100 about the pivoting axis B in the raising sense R in order to raise the outlet 120 towards a radially outer charging position. Of course, the suspension 130 also pivots in unison with the flanges 140 in an opposite lowering sense when lowering the outlet 120 to a radially inner charging position. However, as will become apparent below, the suspension 130 does not need to ensure blocking against lifting of the chute outlet 120 in the raising sense R.

FIG. 3 illustrates the position of the inherent nominal center of gravity G of the chute in its empty and unworn state. The center of gravity G is indicated throughout the drawings by means of a cross-and-circle symbol. As in any cantilevered chute design, the suspensions 130 also define a tilt axis T about which the weight of the chute 100, theoretically applied at G, exerts torque onto the support flanges 140 of the charging device when the chute 100 is mounted.

As an important feature of the present invention, it will be appreciated that the suspension 130 is positioned closer to the bottom of the sliding surface defined by the chute body 112 when compared to conventional chutes. As seen in FIG. 3, the geometric center of the suspension 130, which in FIG. 3 coincides with the tilt axis T, is displaced by a distance X from the longitudinal axis L toward the bottom of the chute body 112 (i.e. the side of the chute 100 that is closer to the charging surface). Preferably, this distance is kept small, e.g. at a value of less than 10%, preferably less than 5%, of the length of the downstream chute portion 116 along axis L, in order to minimize eccentricity of the suspensions 130 with respect to the pivoting axis B (see FIG. 6) and in consequence the size of the support flanges 140.

More specifically, both suspensions 130 are arranged so that the oriented acute angle α from the longitudinal axis L to the virtual plane P that passes through the tilt points (and thus through tilt axis T) and the center of gravity G has a positive (clockwise in FIG. 3) signed angular measure, i.e. when expressed in the raising sense R a value that is greater than zero as shown in FIG. 3. The value of the acute angle α is at least not smaller than −5°, in other words: of small absolute measure when negative. Preferably, the acute angle α has a signed value or measure in the raising sense R greater than zero that is also comparatively small, preferably with $0°=<\alpha<=+15°$, more preferably $0°=<\alpha<=+5°$. Accordingly, combined with a vertical exchange position, the small value of angle α significantly reduces tilting torque about tilt axis T when engaging or disengaging the suspensions 130 on the support flanges 140. This is because the design inherently locates the center of gravity G nearly vertically underneath axis T in the exchange position.

In the embodiments of FIG. 3 and FIG. 5, each suspension 130, 330 is further arranged so that the chute exerts little torque about axis T, more specifically, torque in the lowering sense (anticlockwise in FIG. 3-5) in the chute replacement position. Accordingly, these embodiments also avoid any torque reversal when pivoting the chute 100, 300 between the exchange position, which is usually the extreme lowermost position, and the outermost charging position. As shall be noted the replacement position need not be perfectly vertical but may include, especially with a bend mounting head 114, positions in which the longitudinal axis L is generally vertical meaning at an angle β of no more than 10°, preferably no more than 5° to the vertical (positive or negative).

As a beneficial consequence of minimizing tilting torque upon exchange, the suspensions 130 may have a comparatively simple geometrical shape e.g. an elongated polygonal shape such as a rectangular shape shown in FIG. 3 in cross-section (parallel to the plane of FIG. 3). In terms of structure, the suspensions 130 of FIG. 3 form simple lateral protrusions, that protrude in nearly diametrically opposite directions (perpendicular to the plane of FIG. 3, see FIG. 6) and are of elongated shape along an axis that is roughly parallel to axis L. Especially in case of an integrally cast mounting head 114, which is preferably made of cast steel, the suspensions 130 are preferably integrally formed i.e. made of one-piece with the mounting head 114.

As seen in FIG. 3, each rectangular suspension 130 defines a weight-bearing surface 133 to cooperate with a bearing protrusion 142 of the corresponding support flange 140. Furthermore, for providing required reaction to considerable torque exerted in the outermost pivotal position of the chute 100, the suspensions 130 each have respective oppositely oriented torque-transmitting surfaces 135, 137 that are generally transverse to the weight bearing surface 133. The surfaces 135, 137 cooperate with two abutments 145, 147 on the support flanges 140. Whilst the abutments 145, 147 are also provided in the form of pin-shaped protrusions similar to the bearing protrusion 142 protruding from the corresponding support flange 140, other configurations having the same effect are encompassed. The bearing protrusion 142 and abutments 145, 147 are also preferably integrally formed with the supporting flange, e.g. by means of a machining manufacture. The abutments 145, 147 are spaced apart along the axis of the rectangular suspension 130 or the longitudinal axis L in order to minimize the transmission ratio of tilting torque. As will be understood in view of the spacing of the abutments 145, 147, a quite elongated shape of the suspension 130 is preferred for reducing constraints concerning torque transmission. Whereas other shapes are possible, in the simple design of FIG. 3, each suspension 130 comprises a single coherent mounting protrusion 132 that serves the combined purpose of weight bearing and torque transmitting holder. Preferably each protrusion 132 is of elongated shape along a direction that is parallel or at only a small angle, e.g. of less than 5° with respect to the longitudinal axis L. This permits simplified vertical mounting/dismounting upwards and/or downwards for replacement of the chute 100.

As will be understood, the design of FIG. 3 theoretically permits tilting of the chute 100 in the raising direction R with respect to the support flanges 140. Such tilting, however, does not occur during operation, since the jamming torque exerted by gravity is inherently directed in the lowering sense as set out above. Nevertheless this additional degree of freedom simplifies replacement since it reduces or eliminates the risk of the suspensions 130 becoming blocked i.e. being choked or becoming wedged on the support flanges 140. Moreover, disengaging the suspensions 130 becomes possible merely by a minor pivoting in lowering sense beyond the position shown in FIG. 3.

In order to preclude any risk of dropping or falling of the "freely" suspended chute 100, as may occur when an explosion or other shock-wave occurs in the reactor, the suspension 130 may have a pinhole to receive a safety pin or bolt provided on the support flange 140. When the pin is removed, the suspensions 130 form the above-mentioned "free suspension", i.e. tilting in the raising sense R relative to the support flanges is possible e.g. to facilitate removal by lifting. To reduce wear of such safety contrivance (not shown in detail in FIG. 3-5), the safety pin and cooperating pinhole are preferably provided coaxially to the tilt axis T.

Figure 4:
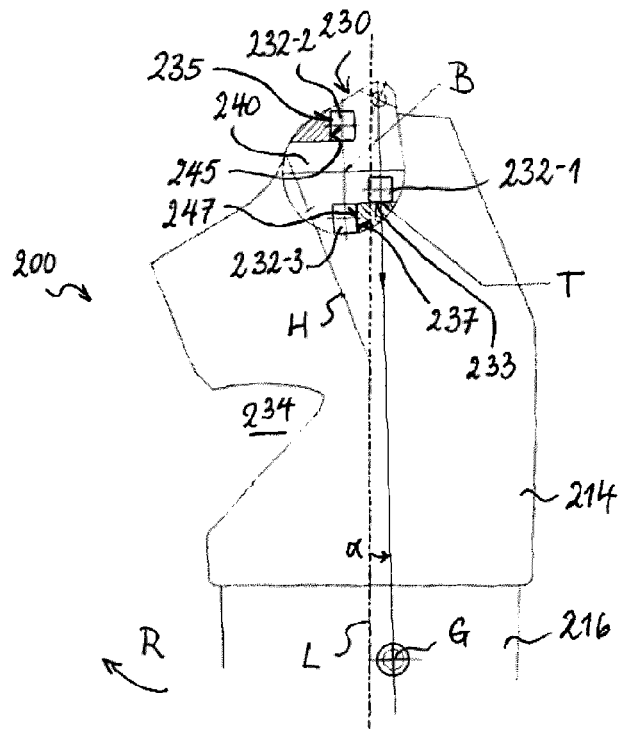
FIG. 4 is a partial longitudinal side view of a second embodiment of a distribution chute according to the invention.

FIG. 4 shows the upstream region of a second embodiment of a chute 200 concerning which only main differences with respect to the previous embodiment will be detailed. Identical or functionally identical features are provided with reference signs having an incremented hundreds digit in FIG. 4. As a noteworthy difference, the acute angle α of FIG. 4 is slightly negative, i.e. satisfies, $0°>α≥−5°$ (the positive sense of angles being the raising sense R). Accordingly, a torque reversal does occur, but due to the small absolute value of α reversal does not occur during normal operation. The chute is designed so that reversal occurs only when the chute 200 is pivoted to its exchange position, just before reaching the position illustrated in FIG. 4. Accordingly, a self unblocking function is achieved with this design, whereas the chute 100 can still be easily exchanged, because the suspension is also designed as "free suspension" i.e. permits tilting in the raising sense R (unless a safety pin is engaged).

As another difference in FIG. 4, the configuration of the suspension 230 and support flanges 240 is inverted compared to FIG. 3. In other words, instead of a single coherent protrusion, the suspension 230 has three distinct mounting protrusions 232-1, 232-2, 232-3. The first protrusion 232-1 provides the weight-bearing surface 233. The other two protrusions 232-2, 232-3 are also spaced generally along axis L and provide oppositely oriented torque-transmitting surfaces for counter-acting torque about the tilt axis T in the lowering sense. Accordingly, the support flanges 240 cooperating with a chute of FIG. 4 differ in that they include two distinct protrusions that provide a weight bearing surface 242 that cooperates with surface 233 and two abutment surfaces 245, 247 cooperating with the protrusions 232-2, 232-3 of the suspension 230. Finally, the mounting head 214 of FIG. 4 has a reduced bend so that the chute 200 may be exactly vertical in its exchange position (β=0).

FIG. 5 illustrates a third embodiment of a distribution chute 300. Again only main differences will be described because the chute 300 is very similar in design to the chute of FIG. 3 especially as concerns the position of the suspensions 330 placed closer to the bottom of the chute body 316, namely by distance X compared to a typical central suspension coinciding with the pivoting axis.

The chute 300 has a suspension 330 formed of a single coherent protrusion 322 that is of trapezoidal shape tapering towards the outlet of the chute 300 and symmetrical about its longitudinal axis. This shape provides a self-positioning function during the final stage of mounting the chute 300 to the support flanges. In consequence, as another benefit, the corresponding support flanges (not shown) have two lower protrusions 343, 345 that carry the weight of the chute by engaging the lateral surfaces 335, 337 at the tip of the trapezoidal protrusion 332. A torque resisting function is also assumed by one of these two protrusions, namely protrusion 345 together with the third protrusion or abutment 347 of the support flange. Accordingly, the tapering long sides of the trapezoidal protrusion 332 serve as torque-transmitting surfaces 335, 337. Other than the different shape of the protrusion 332 forming the suspension 330 and corresponding protrusions/abutments on the cooperating flange, the embodiment of FIG. 5 is identical to that of FIG. 3.

Figure 6:
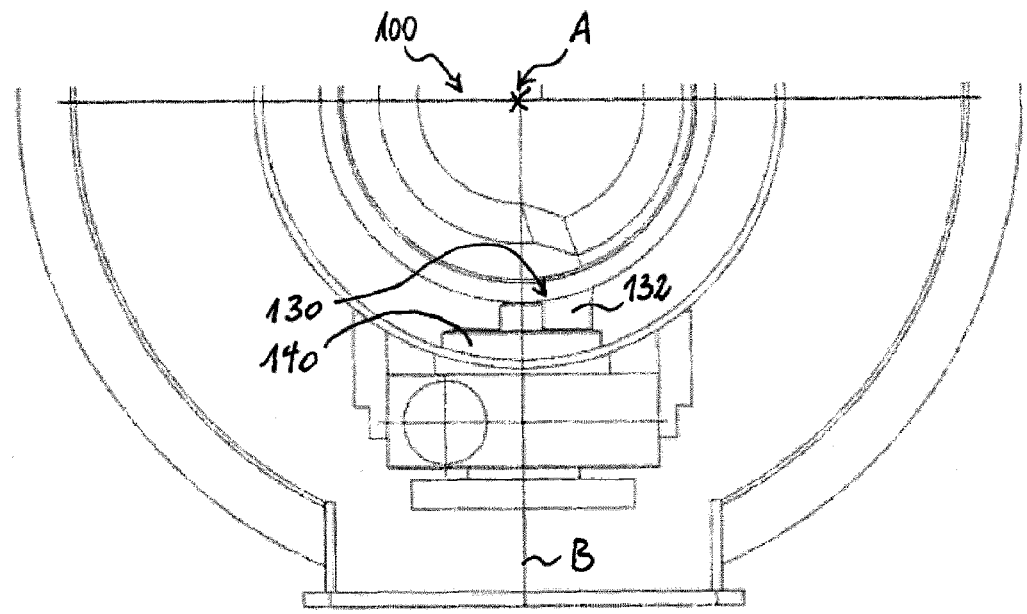
FIG. 6 and FIG. 7 are respective partial sectional top views of a first and of a second embodiment of a charging device equipped with a distribution chute according to the invention.
Figure 7:
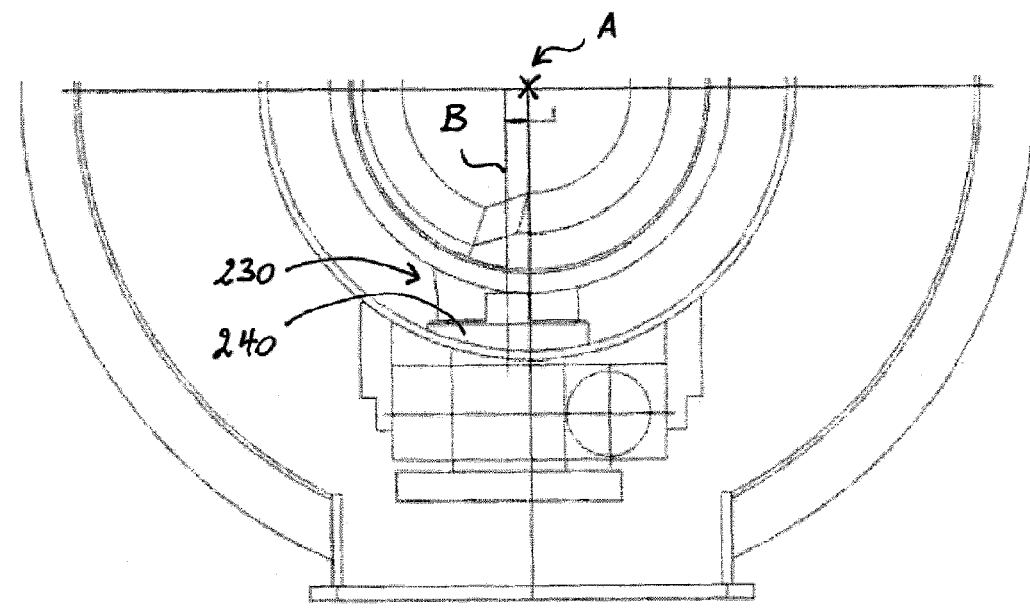

FIG. 6-7 illustrate each a horizontal half-section of a symmetrical charging device. FIG. 6 illustrates an embodiment, in which the pivoting axis B (which may coincide or not with the tilt axis T), which is defined by the tilting shafts that support and actuate the support flanges 140, is conventionally arranged because it perpendicularly crosses the rotational axis A. FIG. 7 illustrates an alternative embodiment, in which the pivoting axis B (which may again coincide or not with the tilt axis T) is unconventionally offset from the rotational axis A.

Figure 8:
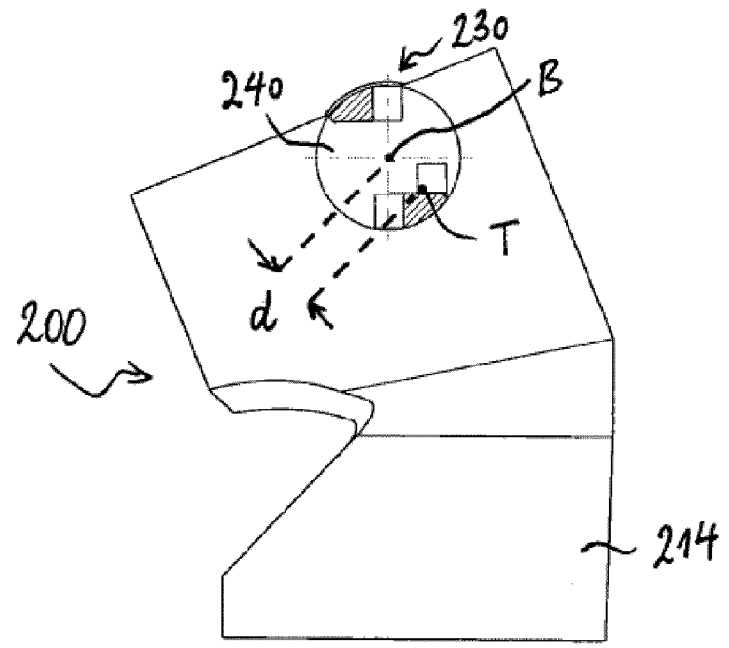
FIG. 8 is a longitudinal side view of the mounting head of the distribution chute of FIG. 4.
Figure 9:
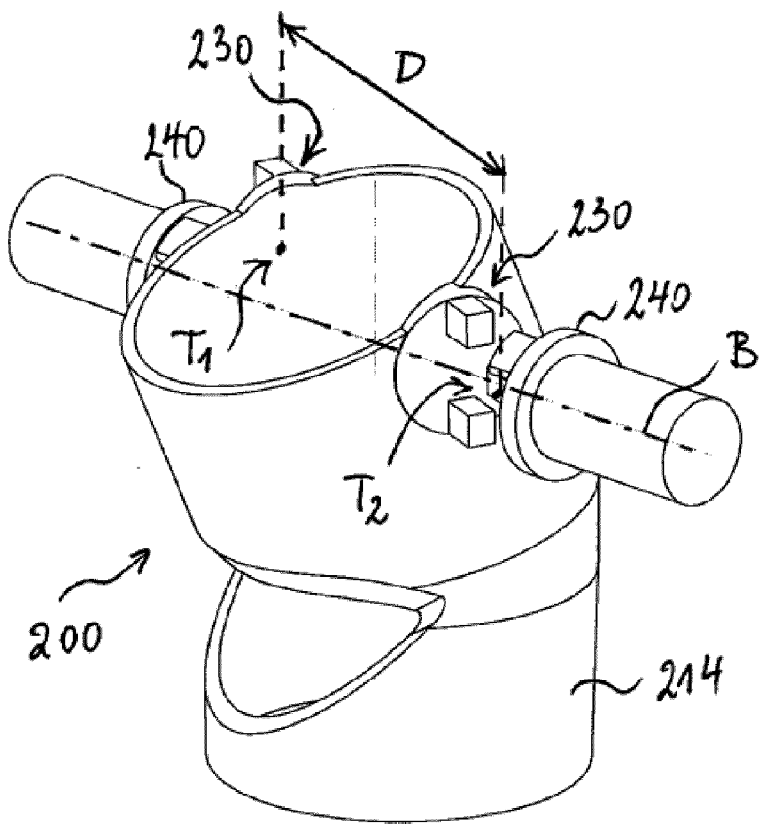
FIG. 9 and FIG. 10 are perspective views of the distribution chute of FIG. 4 during the mounting or dismounting thereof.
Figure 10:
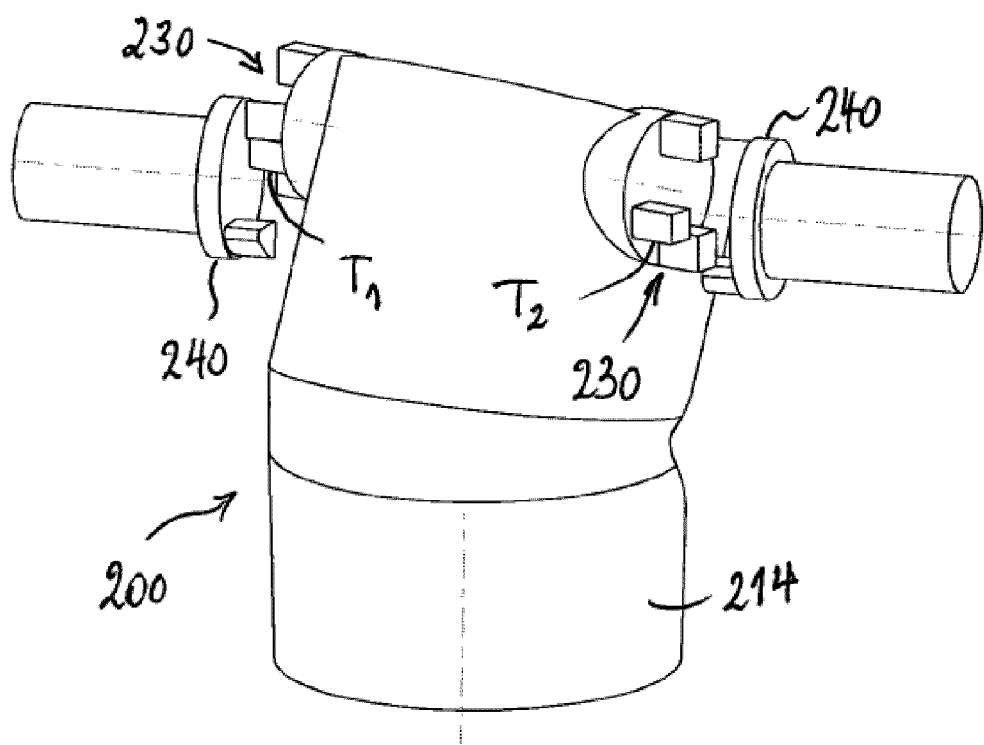

FIGS. 8-10 illustrate the dismounting of a distribution chute from the charging device on the example of the distribution chute 200 of FIG. 4. For sake of clarity of the drawings, not all of the reference numbers of FIG. 4 have been repeated in FIGS. 8-10. FIG. 8 shows the distance d between the tilt axis T and the pivoting axis B, while FIG. 9 shows the distance D between the first and second tilt points $T_1, T_2$.

FIG. 8 shows the upper part (mounting head 214) of the distribution chute 200 in the chute replacement position, in which the center of gravity (not shown in FIG. 8) and the tilt axis T lie in the same vertical plane. In the replacement position, the weight of the distribution chute 200 therefore causes no or no significant jamming torque between the chute suspensions 230 and the support flanges 240 of the charging device. In addition, the mounting protrusions (232-1, 232-2 and 232-3 in FIG. 4) are arranged in such a way that the distribution chute may be lifted from the support flanges 240 in a vertical translational movement without the mounting protrusions interfering with the corresponding abutments of the support flanges 240.

Supposing that the distribution chute is in a normal operational position, the dismounting begins with rotating the support flanges about the pivoting axis in the lowering sense until the chute is in the replacement position (as shown in FIG. 8). The distribution chute is then lifted from the support flanges in a vertical translational movement along the rotational axis. When the distribution chute has been raised at least until the suspensions 230 are higher than the support flanges 240, it is rotated relative to the support flanges 240, e.g. by an angle sufficient to bring the support flanges 240 out of the trajectory of the suspensions on their way down or further up. It should be noted that, in practice, it is easier to rotate the charging device while keeping the orientation of the distribution chute constant in a stationary reference frame. The angle of relative rotation preferably amounts to at least 15° to 25°. FIGS. 9 and 10 show the distribution chute 200 in the lifted, rotated position. Finally, the distribution chute is lowered along the rotational axis in a translational movement. Since the distribution chute undergoes only translational movements once it is lifted from the support flanges, it is particularly easy to dismount the chute using cables or ropes (not shown in the drawings).

The mounting procedure corresponds to the dismounting procedure explained hereinabove in time reversal. Accordingly, it need not be explained in detail.

It should be noted that, if the distribution chute is to be removed from or introduced into the metallurgical reactor via the top portion of the charging device, the relative rotation between the chute and the support flanges about the vertical axis is not necessary. Typically, however, the removal or the introduction of the distribution chute will be effected through a door in the top portion of the metallurgical reactor, but below the charging device.

While specific embodiments have been described in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A distribution chute for a charging device that is configured for rotating said chute about a rotational axis and pivoting said chute about a pivoting axis, in particular for a charging device of a shaft furnace, said chute comprising:
an upstream mounting head and a chute body having an elongated downstream chute portion with a longitudinal axis, said downstream chute portion defining a sliding surface, on which charge material can slide, and an outlet, through which charge material can leave said chute body during operation;
at least two lateral suspensions on said mounting head for mounting said chute to at least two corresponding support flanges of the charging device, said support flanges being pivotable about said pivoting axis in a raising sense for raising said outlet to a radially outermost charging position and in an opposite lowering sense for lowering said outlet to a radially innermost charging position with respect to the rotational axis;
wherein said chute has a center of gravity and said suspensions define a first and a second tilt point, respectively, about which the weight of said chute exerts jamming torque onto the support flanges of the charging device when said chute is mounted to the charging device;
wherein the ratio of the distance between each one of said tilt points and said pivoting axis to the distance between the first and second tilt points amounts to 0.25 at most; and
wherein said suspensions are arranged so that an oriented acute angle from said longitudinal axis to a plane through said tilt points and said center of gravity has an angular measure in the raising sense comprised in the range from −5° to 15°.

2. The distribution chute according to claim 1, wherein said suspensions are arranged so that said chute exerts torque in the lowering sense onto the support flanges when it is being pivoted into a chute replacement position, in which said longitudinal axis is oriented substantially vertically at an angle of less than 5° to the vertical.

3. The distribution chute according to claim 1, wherein said acute angle has a measure in the raising sense that is greater than zero.

4. The distribution chute according to claim 1, wherein said suspensions are arranged on said chute so that said center of gravity is located at a distance from a plane passing through said first and second tilt points and parallel to said longitudinal axis that is less than 10% of the length of said downstream chute portion.

5. The distribution chute according to claim 1, wherein said mounting head is of annular circumferentially closed configuration and wherein said suspensions are integrally formed with said mounting head so as to protrude laterally and oppositely, said suspensions and said mounting head being preferably integrally cast with each other.

6. The distribution chute according to claim 1, wherein at least one pair of a suspension and a corresponding support flange comprises a safety pin and a cooperating pin hole, said suspensions and said support flanges being configured for precluding tilting of said chute in the lowering sense relative to said support flanges whilst permitting tilting of said chute in the raising sense relative to said support flanges when said safety pin is removed, said safety pin having an axis coinciding with a tilt axis passing through said tilt points.

7. The distribution chute according to claim 1, wherein each suspension comprises at least one lateral protrusion having a weight-bearing surface to cooperate with a bearing protrusion on the corresponding support flange and at least two oppositely oriented torque-transmitting surfaces that are generally transverse to said weight bearing surface to cooperate with at least two abutments that are preferably spaced apart along said longitudinal axis on the corresponding support flange.

8. The distribution chute according to claim 7, wherein each suspension comprises a single coherent mounting protrusion, said protrusion being elongated along a direction that is preferably at an angle of less than 5° with said longitudinal axis.

9. The distribution chute according to claim 8, wherein said coherent mounting protrusion is of polygonal mirror-symmetrical shape with respect to its elongation.

10. The distribution chute according to claim 7, wherein each suspension comprises at least three distinct mounting protrusions, a first protrusion having said weight bearing surface as well as a second and third protrusion each having one and the other of said opposite torque-transmitting surfaces, respectively.

11. The distribution chute according to claim 1, wherein said upstream mounting head is bent so that it has a central axis at a bend angle with respect to said longitudinal axis, said bend angle having an angular measure in the range from 15° to 45°.

12. The distribution chute according to claim 11, wherein, in said chute replacement position, said longitudinal axis of said elongated downstream chute portion is at an angle, herein denoted $\beta$, to the vertical, which has an angular measure in the raising sense in the range of $0° \leq \beta \leq +5°$.

13. The distribution chute according to claim 11, wherein said elongated downstream chute portion is of conically or cylindrically tubular and circumferentially closed configuration and fixed to said mounting head and wherein said mounting head comprises a recess that permits pivoting said chute to a radially further outward charging position in said raising sense.

14. A charging device configured for rotating a distribution chute about a rotational axis and pivoting the chute about a pivoting axis, in particular a charging device of a shaft furnace, said charging device comprising:
a rotor that is rotatable about said rotational axis and has at least two opposite support flanges cooperating with at least two laterally opposite suspensions of the chute, said support flanges being pivotable about said pivoting axis in a raising sense for raising an outlet of said chute to a radially outermost charging position and in an opposite lowering sense for lowering said outlet to a radially innermost charging position with respect to said rotational axis;
and a distribution chute according to claim 1.

15. The charging device according to claim 14, wherein said pivoting axis perpendicularly crosses said rotational axis and wherein a tilt axis passing through said tilt points, about which the weight of said chute exerts torque onto the support flanges, is offset from said pivoting axis.

16. The charging device according to claim 15, wherein said tilt axis is offset from said pivoting axis in a direction toward said sliding surface of said chute body.

17. A method of mounting a distribution chute according to claim 1 to a charging device that is configured for rotating said chute about a rotational axis and pivoting said chute about a pivoting axis, said charging device comprising at least two support flanges, corresponding to the at least two suspensions of said distribution chute, arranged diametrically opposed to one another with respect to said rotational axis, said method comprising:
   aligning said at least two suspensions with said support flanges while lowering said distribution chute along said rotational axis and making said at least two suspensions rest upon said support flanges, and
   rotating said support flanges about said pivoting axis in the raising sense, so that the weight of said chute exerts jamming torque onto the support flanges.

18. The method as claimed in claim 17, wherein, prior to said aligning of said at least two suspensions with said support flanges, said distribution chute is raised along said rotational axis until said at least two suspensions are higher than said support flanges.

19. The method as claimed in claim 17, wherein, while said distribution chute is raised, said distribution chute is kept rotated about said rotational axis relative to said charging device so as to allow said at least two suspensions to pass said support flanges.

20. A method of mounting a distribution chute to a charging device that is configured for rotating said chute about a rotational axis and pivoting said chute about a pivoting axis, said charging device comprising at least two support flanges arranged diametrically opposed to one another with respect to said rotational axis, said distribution chute comprising at least two lateral suspensions corresponding to said support flanges, said method comprising:
   raising said distribution chute along said rotational axis until said at least two suspensions are higher than said support flanges;
   while said distribution chute is raised, keeping said distribution chute rotated about said rotational axis relative to said charging device so as to allow said at least two suspensions to pass said support flanges;
   aligning said at least two suspensions with said support flanges while lowering said distribution chute along said rotational axis and making said at least two suspensions rest upon said support flanges; and
   rotating said support flanges about said pivoting axis in a raising sense of the distribution chute, so that the weight of said chute exerts jamming torque onto the support flanges.

21. A method of dismounting a distribution chute according to claim 1 from a charging device that is configured for rotating said chute about a rotational axis and pivoting said chute about a pivoting axis, said charging device comprising at least two support flanges, corresponding to the at least two suspensions of said distribution chute, arranged diametrically opposed to one another with respect to said rotational axis, said method comprising:
   rotating said support flanges about said pivoting axis in the lowering sense until the weight of said chute exerts no or no significant jamming torque onto the support flanges;
   lifting said distribution chute from said support flanges and raising said distribution chute along said rotational axis.

22. The method as claimed in claim 21, wherein, after said distribution chute has been raised at least until said suspensions are higher than said support flanges, said distribution chute is lowered along said rotational axis and wherein, while said distribution chute is lowered, said distribution chute is kept rotated about said rotational axis relative to said charging device so as to allow said at least two suspensions to pass said support flanges.

23. A method of dismounting a distribution chute from a charging device that is configured for rotating said chute about a rotational axis and pivoting said chute about a pivoting axis, said charging device comprising at least two support flanges arranged diametrically opposed to one another with respect to said rotational axis, said distribution chute comprising at least two lateral suspensions corresponding to said support flanges, said method comprising:
   rotating said support flanges about said pivoting axis in the lowering sense of said distribution chute, so that the weight of said chute exerts no or no significant jamming torque onto the support flanges;
   lifting said distribution chute from said support flanges and raising said distribution chute along said rotational axis at least until said suspensions are higher than said support flanges; then
   lowering said distribution chute along said rotational axis and, while said distribution chute is lowered, keeping said distribution chute rotated about said rotational axis relative to said charging device so as to allow said at least two suspensions to pass said support flanges.

* * * * *